UNITED STATES PATENT OFFICE.

JOHN HOLLIDAY, OF BROOKLYN, ASSIGNOR TO HIMSELF AND EDWARD N. DICKERSON, OF NEW YORK, N. Y.

PROCESS OF MAKING ALKALINE SALTS OF ANTIMONY.

SPECIFICATION forming part of Letters Patent No. 421,935, dated February 25, 1890.

Application filed September 11, 1886. Serial No. 213,328. (No specimens.)

*To all whom it may concern:*

Be it known that I, JOHN HOLLIDAY, of the city of Brooklyn, in the State of New York, have invented a new process for the manufacture of soluble antimonites, generally considered antimonoso-antimonates, of which the following is a specification.

Metallic antimony, by preference pulverized, is treated in a boiling solution of nitrate or nitrite of soda or potash and caustic soda or potash, or in any mixture of either alkaline nitrate or nitrite with either caustic alkali.

In executing my invention I prefer to proceed as follows: Into a covered tank or retort connected with a condenser and heated by fire or steam I put one thousand pounds of caustic soda, one thousand pounds of nitrate of soda, and run in about four hundred (400) gallons of water. The contents are heated and solution takes place. When boiling, I add gradually from one thousand (1,000) to fifteen hundred (1,500) pounds of finely-pulverized antimony, maintaining the liquid at a steady boil. Much ammonia is evolved during the reaction which ensues, which condenses in the worm. When ammonia ceases to distill, the operation is ended and the solution is an alkaline antimonite. The proportions may be considerably varied and other non-active ingredients—such as salt—may be added without detriment to the process. It is then allowed to stand as it is or diluted with water and allowed to settle. The clear solution of antimonoso-antimonate is then run off and used as it is or evaporated to dryness.

I do not in this specification claim the ordinary fire process for the manufacture of salt.

I claim as my invention—

The process of manufacturing alkaline antimonites, generally considered antimonoso-antimonates, by treating metallic antimony in a hot aqueous solution of an alkaline nitrate or nitrite and caustic alkali, substantially as described.

In testimony whereof I have signed my name to this specification in the presence of two subscribing witnesses.

JOHN HOLLIDAY.

Witnesses:
   ANTHONY GREF,
   WILLIAM A. POLLOCK.